United States Patent
Kotake et al.

(10) Patent No.: US 12,506,160 B2
(45) Date of Patent: Dec. 23, 2025

(54) FUEL CELL

(71) Applicant: HONDA MOTOR CO., LTD., Tokyo (JP)

(72) Inventors: Tomohito Kotake, Wako (JP); Eri Terada, Wako (JP); Kazuyuki Takahashi, Wako (JP); Shinya Watanabe, Wako (JP); Masahiro Mohri, Wako (JP); Hidehumi Kuramitsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 851 days.

(21) Appl. No.: 17/681,806

(22) Filed: Feb. 27, 2022

(65) Prior Publication Data
US 2022/0320531 A1 Oct. 6, 2022

(30) Foreign Application Priority Data
Mar. 31, 2021 (JP) .................. 2021-060750

(51) Int. Cl.
*H01M 8/0202* (2016.01)
*H01M 8/0247* (2016.01)
(Continued)

(52) U.S. Cl.
CPC ....... *H01M 8/0269* (2013.01); *H01M 8/0247* (2013.01); *H01M 8/0273* (2013.01);
(Continued)

(58) Field of Classification Search
None
See application file for complete search history.

(56) References Cited

U.S. PATENT DOCUMENTS 5,270,132 A * 12/1993 Breault ............... H01M 4/96
429/535
5,504,433 A * 4/1996 Kunz ............... G01N 27/12
324/693

(Continued)

FOREIGN PATENT DOCUMENTS

CA  2 588 358 A1  7/2003
CN  104409755 A   3/2015
(Continued)

OTHER PUBLICATIONS

Office Action dated Oct. 8, 2024 issued in the corresponding Japanese Patent Application 2021-060750 with the English machine translation thereof.

(Continued)

*Primary Examiner* — Jonathan Crepeau
(74) *Attorney, Agent, or Firm* — Carrier, Shende & Associates P.C.; Joseph P. Carrier; Jeffrey T. Gedeon

(57) ABSTRACT

A fuel cell includes sensors. Each sensor includes: a sensor portion provided on at least one of separators, a frame member, and an electrolyte membrane; and a wiring portion connected to the sensor portion and extending to an outer peripheral portion of one of the separators or an outer peripheral portion of a membrane electrode assembly. The sensor further includes a base insulating film covering a sensor arrangement region; wiring patterns laminated on the base insulating film; and a covering insulating film covering the wiring patterns and portions of the base insulating film not covered with the wiring patterns.

1 Claim, 7 Drawing Sheets

(51) Int. Cl.

| | |
|---|---|
| *H01M 8/0273* | (2016.01) |
| *H01M 8/04313* | (2016.01) |
| *H01M 8/0432* | (2016.01) |
| *H01M 8/04537* | (2016.01) |
| *H01M 8/1004* | (2016.01) |
| *H01M 8/10* | (2016.01) |

(52) U.S. Cl.
 CPC ... *H01M 8/04313* (2013.01); *H01M 8/04365* (2013.01); *H01M 8/04641* (2013.01); *H01M 8/1004* (2013.01); *H01M 2008/1095* (2013.01); *H01M 2250/20* (2013.01)

(56) References Cited

U.S. PATENT DOCUMENTS

| | | | | |
|---|---|---|---|---|
| 6,214,487 | B1 * | 4/2001 | Kelley | H01M 10/48 |
| | | | | 429/430 |
| 10,283,784 | B2 * | 5/2019 | Vincent | H01M 8/02 |

FOREIGN PATENT DOCUMENTS

| | | | |
|---|---|---|---|
| JP | 2010-032010 | * | 2/1998 |
| JP | 2005-071882 A | | 3/2005 |
| JP | 2008-146910 A | | 6/2008 |
| JP | 2009-146637 A | | 7/2009 |
| JP | 2010-129263 A | | 6/2010 |
| JP | 2010-135270 A | | 6/2010 |
| JP | 2014-216111 A | | 11/2014 |
| JP | 2016-225284 A | | 12/2016 |
| JP | 2017-010620 A | | 1/2017 |
| JP | 2021-044168 A | | 3/2021 |

OTHER PUBLICATIONS

Office Action and Search Report dated Oct. 18, 2024 issued in the corresponding Chinese Patent Application No. 202210185545.9 with the English machine translation thereof.

Office Action dated Feb. 19, 2025 issued in the corresponding Chinese Patent Application No. 202210185545.9 with the English machine translation thereof.

* cited by examiner

FUEL CELL

CROSS-REFERENCE TO RELATED APPLICATIONS

This application is based upon and claims the benefit of priority from Japanese Patent Application No. 2021-060750 filed on Mar. 31, 2021, the contents of which are incorporated herein by reference.

BACKGROUND OF THE INVENTION

Field of the Invention

The present invention relates to a fuel cell provided with a sensor for detecting an internal state quantity.

Description of the Related Art

A fuel cell includes a membrane electrode assembly and a pair of separators sandwiching the membrane electrode assembly. A membrane electrode assembly is a structure including an electrolyte membrane that conducts ions such as hydrogen ions and oxygen ions, and an anode and a cathode. The anode and the cathode are laminated on one surface and the other surface of the electrolyte membrane, respectively. One separator is disposed adjacent to the anode. The fuel cell has a fuel gas flow field through which fuel gas flows, between the one separator and the anode. In addition, the fuel cell has an oxygen-containing gas flow field through which oxygen-containing gas flows, between the other separator and the cathode. A plurality of such fuel cells are stacked in the thickness direction to form a fuel cell stack, and the fuel cell stack is mounted on, for example, a fuel cell electric vehicle.

In a fuel cell, measurement of internal environment such as temperature and conductivity, in a power generation state, of various constituent members such as the electrolyte membrane and the electrodes is useful for grasping operation of the fuel cell. Therefore, the internal environment of the fuel cell is measured by a method in which a temperature sensor such as a thermocouple is disposed between the separator and the membrane electrode assembly.

For example, JP 2010-135270 A discloses a technique for measuring the internal temperature of a fuel cell having a membrane electrode assembly in which an electrolyte membrane is sandwiched between an anode and a cathode. This document discloses a technique of arranging a cover body provided with a groove for arranging a sensor on the cathode side.

SUMMARY OF THE INVENTION

In a conventional measurement technique, a sensor such as a thermocouple is disposed between a separator having a normal structure and a membrane electrode assembly to perform measurement. Therefore, the operator needs to arrange the sensor inside the fuel cell, which requires the operator to perform complicated work. In this case, the operator may damage the thin metal wire for the thermocouple during the work. In addition, when the fuel cell is assembled, the position of the sensor may be displaced, and thus the state of the target portion may not be accurately measured.

Further, in the case of the technique disclosed in JP 2010-135270 A, a space for disposing the cover body is required, and the structure of the fuel cell needs to be significantly changed. Further, there is a problem that the thickness of the fuel cell increases due to the arrangement of the cover body.

Therefore, an object of the present invention is to provide a fuel cell capable of easily and accurately measuring a state quantity inside the fuel cell.

According to an aspect of the present invention, there is a fuel cell including: a membrane electrode assembly including an electrolyte membrane, an anode provided on one surface of the electrolyte membrane, and a cathode provided on another surface of the electrolyte membrane; a frame member surrounding an outer peripheral portion of the membrane electrode assembly; a pair of separators sandwiching the membrane electrode assembly; and a sensor including: a sensor portion provided on at least one of the separators, the frame member, or the electrolyte membrane; and a wiring portion connected to the sensor portion and extending to an outer peripheral portion of one of the separators or the outer peripheral portion of the membrane electrode assembly, wherein the sensor further includes: a base insulating film that covers a surface of a sensor arrangement region in which the sensor is arranged; a wiring pattern laminated on the base insulating film; and a covering insulating film that covers the wiring pattern and a portion of the base insulating film that is not covered with the wiring pattern.

According to the fuel cell of the above aspect, the internal state quantity of the fuel cell can be measured easily and accurately.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Hereinafter, a preferred embodiment of the present invention will be described in detail with reference to the accompanying drawings.

Figure 1:
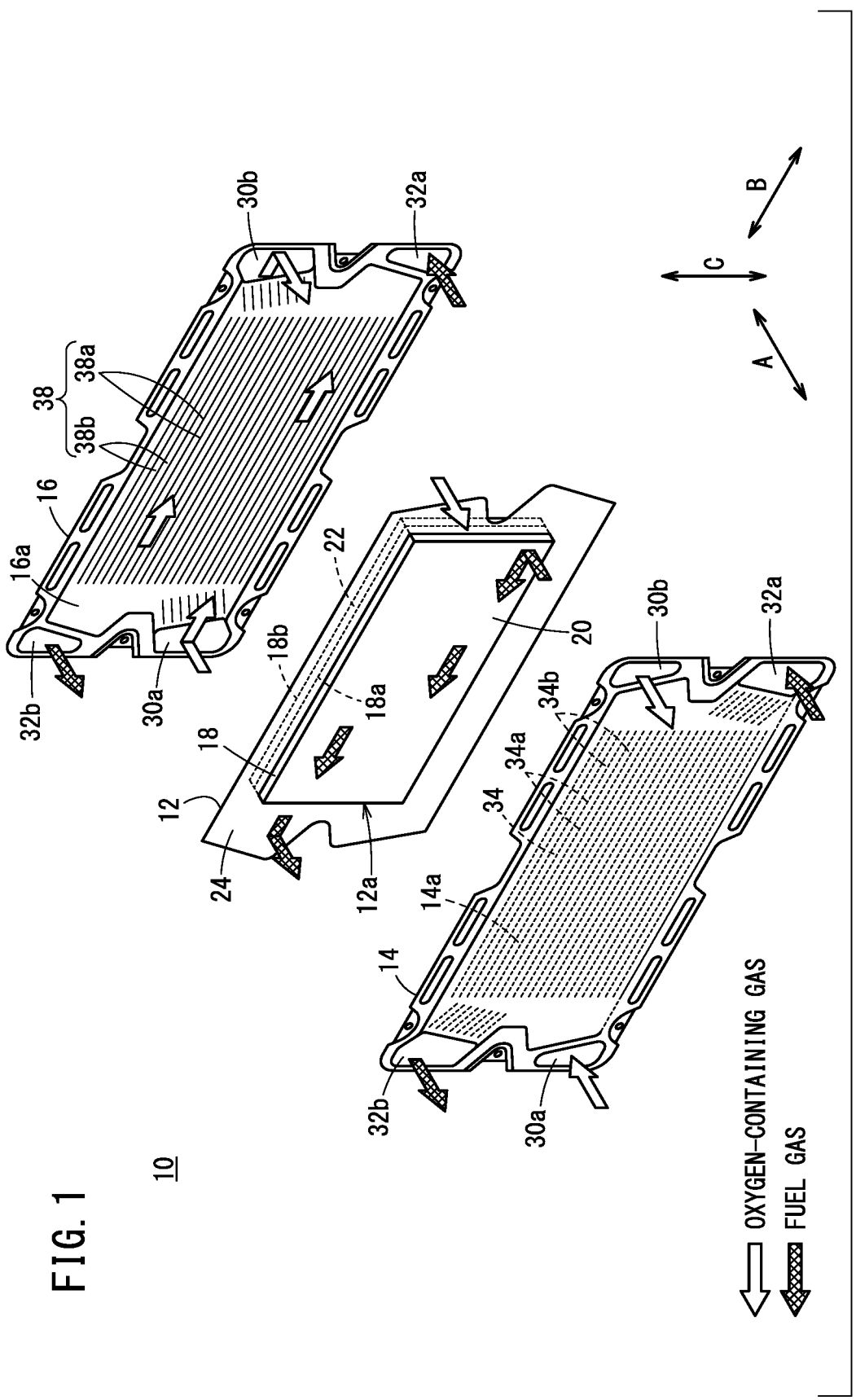
FIG. 1 is a perspective view of a fuel cell according to an embodiment.

As shown in FIG. 1, a fuel cell 10 (power generation cell) includes a frame equipped membrane electrode assembly 12 (hereinafter referred to as a "frame equipped MEA 12"), a first separator 14, and a second separator 16. The first separator 14 and the second separator 16 are disposed on both sides of the frame equipped MEA 12. The fuel cell 10 is formed, for example, into a horizontally long (or vertically long) rectangular shape. The plurality of fuel cells 10 are stacked in the direction of arrow A, for example, to form a fuel cell stack (not shown). For example, the fuel cell stack is mounted on a fuel cell electric vehicle (not illustrated) as an in-vehicle fuel cell stack in a state in which the stacking direction is oriented in the horizontal direction or the vertical direction.

The fuel cell 10 has a structure in which a frame equipped MEA 12 is sandwiched between the first separator 14 and the second separator 16. Each of the first separator 14 and the second separator 16 has a horizontally long (or vertically long) rectangular shape. Each of the first separator 14 and the second separator 16 is formed of, for example, a steel plate, a stainless steel plate, an aluminum plate, a plated steel plate, a titanium plate, a metal plate whose metal surface is subjected to anti-corrosion surface treatment, or a carbon member.

The frame equipped MEA 12 having a rectangular shape includes a membrane electrode assembly 12a (hereinafter referred to as "MEA 12a"). The MEA 12a includes an electrolyte membrane 18, an anode 20 (first electrode) provided on a first surface 18a of the electrolyte membrane 18, and a cathode 22 (second electrode) provided on a second surface 18b of the electrolyte membrane 18.

The electrolyte membrane 18 is, for example, a solid polymer electrolyte membrane (cation exchange membrane). The solid polymer electrolyte membrane is, for example, a thin film of perfluorosulfonic acid containing water, and is made of a material that allows hydrogen ions to permeate therethrough. As the material of the electrolyte membrane 18, a HC (hydrocarbon)-based electrolyte can be used in addition to a fluorine-based electrolyte. The electrolyte membrane 18 is sandwiched and held between the anode 20 and the cathode 22.

The electrolyte membrane 18 is not limited to a solid polymer electrolyte membrane, and may be made of an oxide ceramic having oxygen ion conductivity or a porous material impregnated with various molten salts having proton or carbonate ion conductivity.

The frame equipped MEA 12 further includes a frame member 24 that extends over the entire outer periphery of the electrolyte membrane 18 and that is joined to the anode 20 and the cathode 22. The frame member 24 is disposed so as to be sandwiched between the outer peripheral portion of the anode 20 and the outer peripheral portion of the cathode 22. The frame member 24 is joined to the anode 20 and the cathode 22 with an adhesive or the like. The frame member 24 is formed of a frame-shaped sheet. Although not particularly limited, the frame member may be made of a resin material, for example. Depending on the design of the fuel cells 10, the MEA 12 may be constituted by only the MEA 12a without the frame member 24.

As shown in FIG. 1, the fuel cell 10 has an oxygen-containing gas supply passage 30a and a fuel gas discharge passage 32b at one end thereof in the direction indicated by the arrow B (horizontal direction). The oxygen-containing gas supply passage 30a communicates with another oxygen-containing gas supply passage 30a in the stacking direction indicated by the arrow A. The fuel gas discharge passage 32b also communicates with another fuel gas discharge passage in the stacking direction. The oxygen-containing gas supply passage 30a supplies, for example, air as the oxygen-containing gas. The fuel gas discharge passage 32b discharges, for example, a hydrogen-containing gas as the fuel gas. The oxygen-containing gas supply passage 30a and the fuel gas discharge passage 32b are arranged in the direction indicated by an arrow C.

The fuel cell 10 has a fuel gas supply passage 32a for supplying the fuel gas and an oxygen-containing gas discharge passage 30b for discharging the oxygen-containing gas, at the other end in the direction indicated by the arrow B. The fuel gas supply passage 32a communicates with another fuel gas supply passage in the direction of arrow A. The oxygen-containing gas discharge passage 30b communicates with another oxygen-containing gas discharge passage in the direction of the arrow A. The fuel gas supply passage 32a and the oxygen-containing gas discharge passage 30b are arranged in a direction indicated by an arrow C.

The first separator 14 has a fuel gas flow field 34 on an inner surface 14a thereof that faces the frame equipped MEA 12. The fuel gas flow field 34 is connected to the fuel gas supply passage 32a and the fuel gas discharge passage 32b. The fuel gas flow field 34 is formed between the first separator 14 and the frame equipped MEA 12. The fuel gas flow field 34 has a plurality of protrusions 34a and flow grooves 34b formed between the protrusions 34a. Each protrusion 34a bulges toward the anode 20 and abuts against the anode 20. The protrusion 34a is formed in a straight line shape or a wavy line shape, and extends in the arrow B direction. The flow grooves 34b are formed between the plurality of protrusions 34a. The protrusions 34a and the flow grooves 34b are alternately arranged in the flow field width direction (arrow C direction).

The second separator 16 has an oxygen-containing gas flow field 38 on an inner surface 16a thereof that faces the frame equipped MEA 12. The oxygen-containing gas flow field 38 is connected to the oxygen-containing gas supply passage 30a and the oxygen-containing gas discharge passage 30b. The oxygen-containing gas flow field 38 is formed between the second separator 16 and the frame equipped MEA 12. The oxygen-containing gas flow field 38 has a plurality of protrusions 38a and flow grooves 38b formed between the protrusions 38a. Each protrusion 38a bulges toward the cathode 22 and abuts against the cathode 22. The protrusion 38a is formed into a straight line shape or a wavy line shape, and extends in the arrow B direction. The flow grooves 38b are formed between the plurality of protrusions 38a. The protrusions 38a and the flow grooves 38b are alternately arranged in the flow field width direction (arrow C direction).

The protrusion 34a of the first separator 14 and the protrusion 38a of the second separator 16 are formed at positions face-to-face with each other. The MEA 12a is held by being sandwiched between the protrusions 34a and the protrusions 38a.

Figure 2:
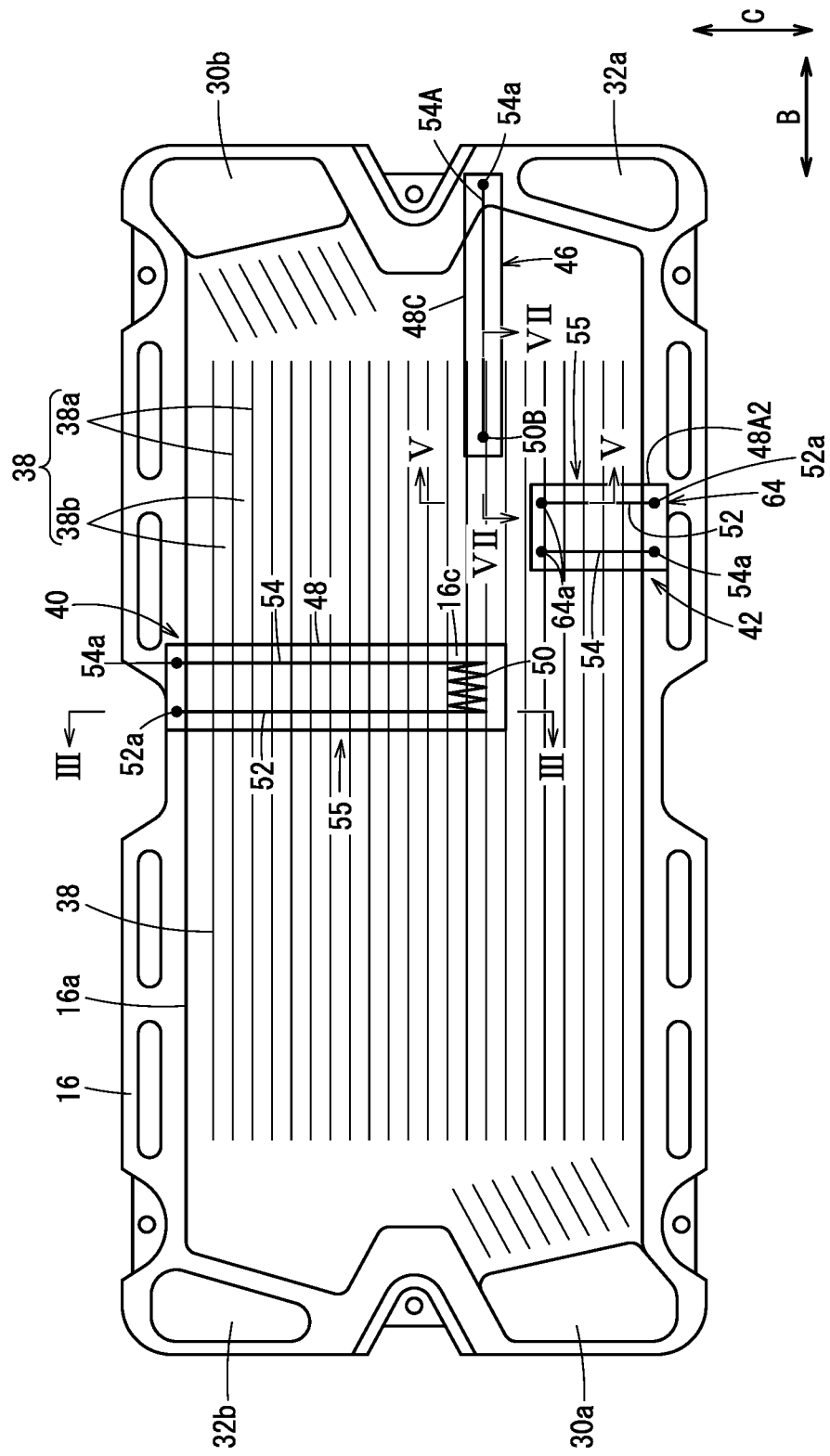
FIG. 2 is a plan view of a first surface of a second separator of FIG. 1.
Figure 4:
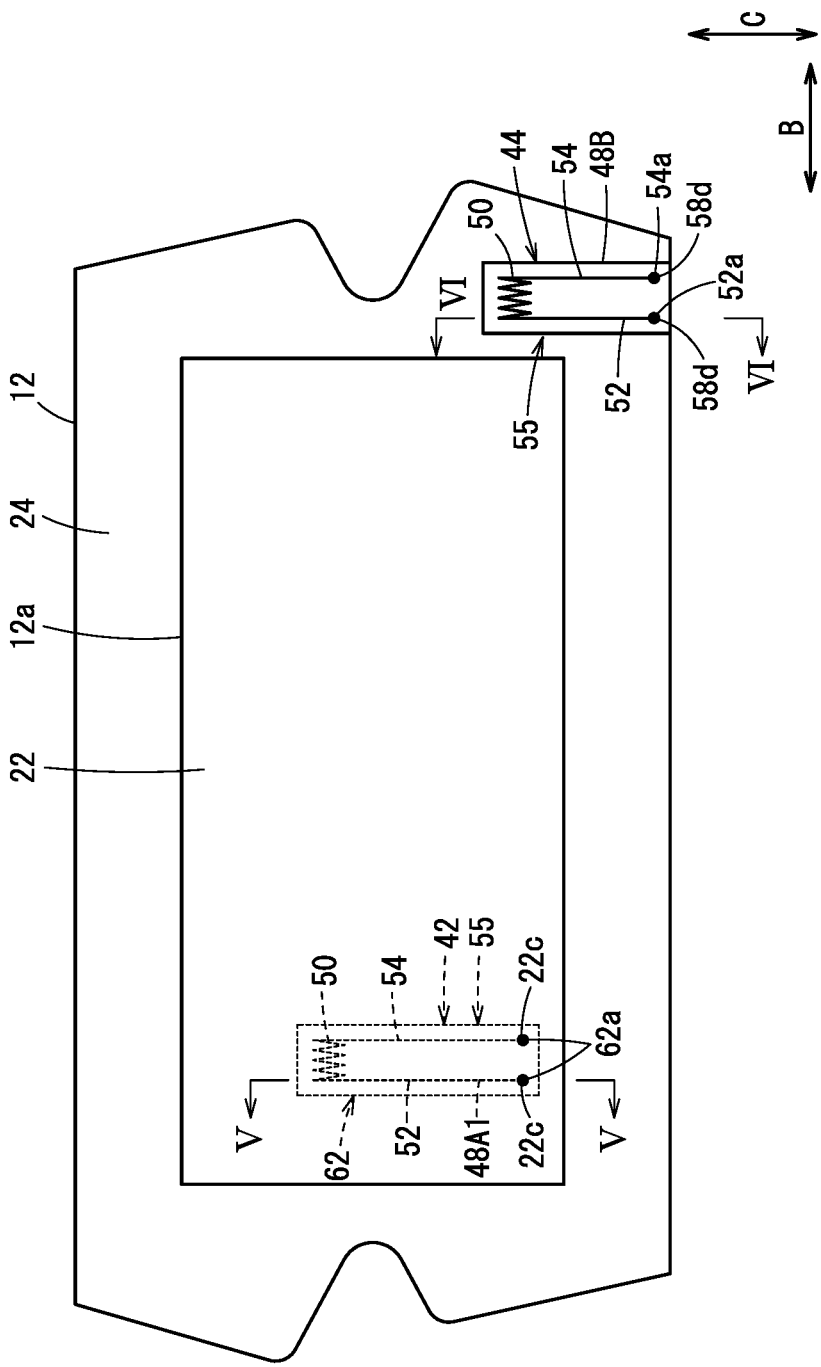
FIG. 4 is a plan view of a membrane electrode assembly of FIG. 1.

Next, sensors 40, 42, 44, 46 of the fuel cell 10 of the present embodiment will be described. As shown in FIGS. 2 and 4, the fuel cell 10 includes a first sensor 40, a second sensor 42, a third sensor 44, and a fourth sensor 46. The first sensor 40 is a sensor that detects the temperature of the second separator 16. The second sensor 42 is a sensor that detects the temperature of the electrolyte membrane 18. The third sensor 44 is a sensor that detects the temperature of the frame member 24. The fourth sensor 46 is a sensor that detects the impedance of the MEA 12a.

As shown in FIG. 2, the first sensor 40 is a temperature sensor formed in a sensor arrangement region 48 provided on the inner surface 16a of the second separator 16. The first sensor 40 includes a sensor portion 50 provided at a portion corresponding to a measurement target portion 16c of the second separator 16, and a wiring portion 55 including a first wiring pattern 52 and a second wiring pattern 54 connected to the sensor portion 50. The sensor portion 50, the first wiring pattern 52, and the second wiring pattern 54 are formed of a conductor formed in a thin film shape.

The sensor portion 50 is formed of a conductive material whose resistance value changes with temperature, such as a metal or a semiconductor. The sensor portion 50 has a zigzag pattern in a plan view, as shown in the drawing. The first wiring pattern 52 is connected to one end of the sensor portion 50, and the second wiring pattern 54 is connected to the other end of the sensor portion 50. The first wiring pattern 52 and the second wiring pattern 54 are formed in a straight line shape. The first wiring pattern 52 and the second wiring pattern 54 extend parallel to each other toward the outer peripheral portion of the second separator 16.

The sensor portion 50, the first wiring pattern 52, and the second wiring pattern 54 are covered with an insulating film. The insulating film prevents a short circuit between the sensor portion 50, the first wiring pattern 52, or the second wiring pattern 54 and the second separator 16 formed of a conductive material such as metal. The insulating film prevents the signals of the sensor portion 50 from being affected by the power generation potential or the like of the MEA 12a.

Figure 3:
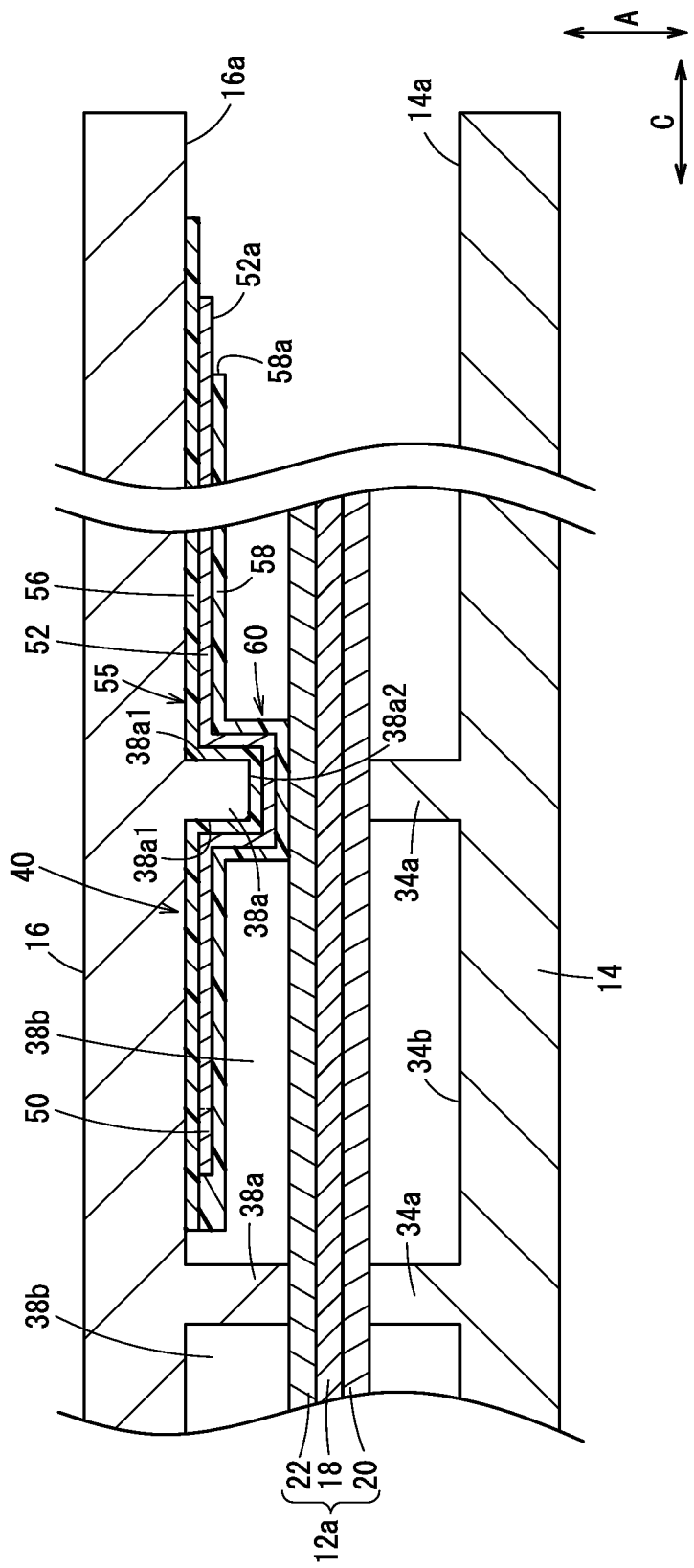
FIG. 3 is a cross-sectional view of the fuel cell taken along line III-III of FIG. 2.

As shown in FIG. 3, the insulating film of the first sensor 40 includes a base insulating film 56 and a covering insulating film 58. The base insulating film 56 is an insulating film formed on the inner surface 16a of the second separator 16. The base insulating film 56 is made of an insulating resin such as a polyimide resin or a parylene resin. When the fuel cell 10 is formed as a solid oxide fuel cell, the base insulating film 56 may be formed of a heat-resistant insulator such as an oxide. The base insulating film 56 is formed so as to cover the entire sensor arrangement region 48 of FIG. 2.

As shown in FIG. 3, the first wiring pattern 52 and the second wiring pattern 54 of the first sensor 40 each have a protrusion crossing portion 60 crossing the protrusion 38a of the second separator 16. The base insulating film 56 covers a side wall 38a1 and an upper end portion 38a2 of the protrusion 38a, in the protrusion crossing portion 60.

Conductor films constituting the sensor portion 50, the first wiring pattern 52, and the second wiring pattern 54 are formed on the base insulating film 56. A method of forming the conductor films will be described later.

The covering insulating film 58 covers the sensor portion 50, the first wiring pattern 52, the second wiring pattern 54, and a portion of the base insulating film 56 that is not covered by the sensor portion 50, the first wiring pattern 52, and the second wiring pattern 54. The covering insulating film 58 can be formed using an insulating resin material such as a polyimide resin or a parylene resin. In the present embodiment, the covering insulating film 58 is formed with a uniform height. That is, a portion of the covering insulating film 58 that fills a gap between the first wiring pattern 52 and the second wiring pattern 54 (see FIG. 2) is formed thicker than a portion of the covering insulating film 58 that covers the first wiring pattern 52 and the second wiring pattern 54. As a result, the covering insulating film 58 has a uniform height so that there is no difference in level between the first and second wiring patterns 52, 54 and the other portions. As a result, the covering insulating film 58 can distribute the surface pressure to a wider portion, in the protrusion crossing portion 60, and damage to the wiring patterns 52 and 54 due to concentration of load can be suppressed.

In addition, the covering insulating film 58 may be formed such that the thickness of a portion on the protrusion crossing portion 60 is larger than a thickness of the other portions. With such a formation, even when the second separator 16 and the frame equipped MEA 12 are misaligned in the plane direction due to vibration or thermal cycling, deterioration of the covering insulating film 58 due to wear can be suppressed.

In FIG. 3, for convenience of explanation, the thicknesses of the base insulating film 56, the first wiring pattern 52, and the covering insulating film 58 are exaggerated. However, these members are actually thinner than the cathode 22 of the MEA 12a. In addition, in the protrusion crossing portion 60, the thicknesses of the base insulating film 56, the first wiring pattern 52, and the covering insulating film 58 can be absorbed by deformation of each member constituting the MEA 12a.

As shown in FIG. 2, the first wiring pattern 52 has an end portion disposed at the outer peripheral portion of the second separator 16, and has a first connection pad 52a at the end portion. The second wiring pattern 54 has an end portion disposed on the outer peripheral portion of the second separator 16, and has a second connection pad 54a at the end portion. As shown at the right end of FIG. 3, the first connection pad 52a is formed in an opening portion 58a of the covering insulating film 58 covering the first wiring pattern 52. In the first connection pad 52a, the first wiring pattern 52 is exposed from the covering insulating film 58. The second connection pad 54a (see FIG. 2) has a structure similar to that of the first connection pad 52a, and the second wiring pattern 54 is exposed from the covering insulating film 58.

Although the first sensor 40 is configured as described above, the present embodiment is not limited thereto, and the first sensor 40 may be provided on the first separator 14.

Further, the first sensor 40 is not limited to a resistance thermometer, and may be configured as a thermocouple, for example. In this case, the first wiring pattern 52 and the second wiring pattern 54 are formed of different kinds of metals. The sensor portion 50 can be configured as a contact point between the first wiring pattern 52 and the second wiring pattern 54.

In addition, the first wiring pattern 52 and the second wiring pattern 54 may be disposed along the flow groove 38b. In this case, the sensor portion 50 can reduce the number of the protrusion crossing portions 60 and can more effectively suppress deterioration of the first sensor 40.

Next, a method of manufacturing the fuel cell 10 having the first sensor 40 will be described.

First, as shown in FIG. 1, the second separator 16 is prepared. Next, the base insulating film 56 (see FIG. 3) is formed over the entire sensor arrangement region 48 on the inner surface 16a of the second separator 16 shown in FIG. 2. The base insulating film 56 is formed by applying a polyimide resin by an inkjet method. Alternatively, the base insulating film 56 may be formed by depositing a parylene resin by a vacuum deposition method.

Next, as shown in FIG. 3, a mask having an opening hole of a predetermined shape is disposed on the base insulating film 56. Next, a conductor film is formed on a portion of the base insulating film 56 that is exposed through the opening hole of the mask by various film forming methods such as a vapor deposition method, a sputtering method, and a plating method. As a result, the sensor portion 50, the first wiring pattern 52, and the second wiring pattern 54 are formed on the base insulating film 56.

Next, the mask is removed. Next, the covering insulating film 58 is formed on the sensor portion 50, the first wiring pattern 52, the second wiring pattern 54, and the exposed base insulating film 56. The covering insulating film 58 is formed in the same manner as the base insulating film 56.

Through the above steps, the second separator 16 with the first sensor 40 formed thereon is completed.

Thereafter, the second separator 16 is brought into contact with the cathode 22 of the frame equipped MEA 12 in the same manner as in the production of the ordinary fuel cells 10. In addition, the first separator 14 is brought into contact with the anode 20 of the frame equipped MEA 12. Through the above steps, the cross-sectional structure shown in FIG. 3 is obtained.

Figure 5:
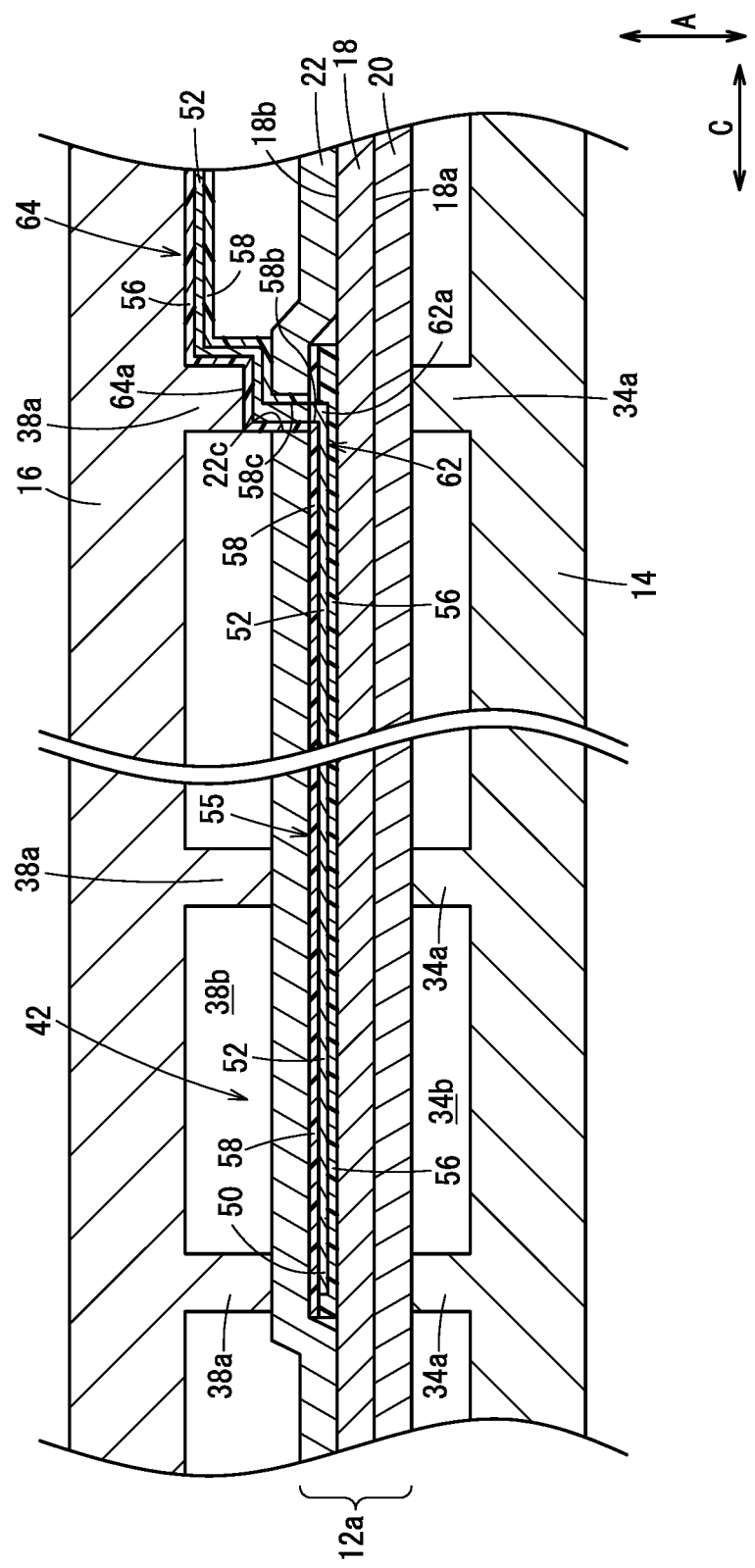
FIG. 5 is a cross-sectional view of the fuel cell taken along line V-V of FIG. 2.

Next, the second sensor 42 will be described with reference to FIGS. 2, 4, and 5.

As shown in FIG. 4, the second sensor 42 is provided on a surface of the electrolyte membrane 18 of the MEA 12a and detects the temperature of the electrolyte membrane 18. As shown in FIG. 5, the second sensor 42 is formed between the second surface 18b of the electrolyte membrane 18 and the cathode 22 in order to obtain an accurate temperature of the electrolyte membrane 18. Although not particularly illustrated, the second sensor 42 may be provided on the first surface 18a of the electrolyte membrane 18. In this case, the second sensor 42 may be disposed between the first surface 18a and the anode 20.

In order for the second sensor 42 to more accurately measure the temperature of the electrolyte membrane 18, the sensor portion 50 is disposed at a portion corresponding to the protrusion 34a of the first separator 14 and the protrusion 38a of the second separator 16. According to this configuration, the sensor portion 50 is pressed by the protrusions 34a and 38a, and the thermal connection state between the sensor portion 50 and the electrolyte membrane 18 is improved.

The second sensor 42 basically has the same structure as the first sensor 40 described with reference to FIGS. 2 and 3, except that the second sensor 42 is formed on the electrolyte membrane 18. The sensor portion 50, the first wiring pattern 52, and the second wiring pattern 54 of the second sensor 42 have the same structure as the sensor portion 50, the first wiring pattern 52, and the second wiring pattern 54 of the first sensor 40. Therefore, in the second sensor 42 shown in FIGS. 4 and 5, components similar to those of the first sensor 40 shown in FIGS. 2 and 3 are denoted by the same reference numerals, and detailed description thereof will be omitted. However, since the outer peripheral portion of the frame equipped MEA 12 does not protrude toward the outside, it is difficult to provide the second sensor 42 with connection terminals for connecting the first wiring pattern 52 and the second wiring pattern 54 to external wiring.

Thus, the second sensor 42 includes a wiring portion 55. The wiring portion 55 includes a first wiring pattern 52 and a second wiring pattern 54. The wiring portion 55 includes a first wiring portion 62 formed in the sensor arrangement region 48A1 on the second surface 18b of the electrolyte membrane 18 shown in FIG. 4 and a second wiring portion 64 formed in the sensor arrangement region 48A2 on the inner surface 16a of the second separator 16 shown in FIG. 2. The second wiring portion 64 has a first wiring pattern 52 and a second wiring pattern 54 that extend to the outer peripheral portion of the second separator 16. The first wiring pattern 52 has a first connection pad 52a at an end located on the outer peripheral portion of the second separator 16, and the second wiring pattern 54 has a second connection pad 54a at an end located on the outer peripheral portion of the second separator 16.

The wiring pattern of the first wiring portion 62 and the wiring pattern of the second wiring portion 64 are electrically connected to each other via a first terminal portion 62a (FIG. 4) provided on the first wiring portion 62 side and a second terminal portion 64a (FIG. 2) provided on the second wiring portion 64. That is, as shown in FIG. 4, each of the first wiring pattern 52 and the second wiring pattern 54 of the first wiring portion 62 has the first terminal portion 62a. As shown in FIG. 5, an opening portion 58b of the covering insulating film 58 is formed in the first terminal portion 62a. Therefore, the first terminal portion 62a has a structure in which the first wiring pattern 52 (or the second wiring pattern 54) is exposed from the opening portion 58b. The first terminal portion 62a is disposed on a portion corresponding to the protrusion 34a of the first separator 14 and the protrusion 38a of the second separator 16.

The second terminal portion 64a is formed on a portion of the inner surface 16a of the second separator 16 that faces the first terminal portion 62a. The second terminal portion 64a is formed on a top portion of the protrusion 38a of the second separator 16. In the second terminal portion 64a, an opening portion 58c is formed in the covering insulating film 58 covering the second wiring portion 64. In the opening portion 58c, the first wiring pattern 52 (or the second wiring pattern 54) of the second wiring portion 64 is exposed.

An opening hole 22c is formed in a portion of the cathode 22 where the first terminal portion 62a and the second terminal portion 64a are formed. The first wiring pattern 52 of the first wiring portion 62 and the first wiring pattern 52 of the second wiring portion 64 are pressed by the protrusions 34a and 38a. Through the opening hole 22c and the opening portions 58b and 58c, the first wiring pattern 52 of the first wiring portion 62 and the first wiring pattern 52 of the second wiring portion 64 abut against each other and are electrically connected to each other. Similarly, the second wiring pattern 54 of the first wiring portion 62 and the second wiring pattern 54 of the second wiring portion 64 are electrically connected to each other via the first terminal portion 62a and the second terminal portion 64a.

Next, a method of manufacturing the fuel cell 10 including the second sensor 42 will be described.

First, the second wiring portion 64 of the second sensor 42 is formed on the inner surface 16a of the second separator 16. The second wiring portion 64 can be formed in the same process as the manufacturing method of the first sensor 40. The second wiring portion 64 is formed simultaneously with the manufacturing process of the first sensor 40.

Next, the frame equipped MEA 12 having the first wiring portion 62 of the second sensor 42 is formed. First, on the electrolyte membrane 18 shown in FIG. 5, the base insulating film 56; the sensor portion 50, the first wiring pattern 52, and the second wiring pattern 54; and the covering insulating film 58 are formed in this order. These steps are similar to the manufacturing step of the first sensor 40, and thus detailed description thereof will be omitted.

Next, the cathode 22 with the opening hole 22c being formed in a portion thereof corresponding to the first terminal portion 62a and the second terminal portion 64a is joined onto the second surface 18b of the electrolyte membrane 18 with the first portion of the second sensor 42 being formed thereon. The anode 20 is joined to the first surface 18a of the electrolyte membrane 18.

Thereafter, the frame member 24 is joined to the outer peripheral portions of the electrolyte membrane 18, the anode 20, and the cathode 22. The frame member 24 is joined so as to be sandwiched between the electrolyte membrane 18 and the cathode 22, and the anode 20. Through the above-described steps, the frame equipped MEA 12 with the first wiring portion 62 of the second sensor 42 being formed is completed.

Thereafter, as shown in FIG. 1, the second separator 16 is brought into contact with the cathode 22 of the frame equipped MEA 12, and the first separator 14 is brought into contact with the anode 20 of the frame equipped MEA 12. As a result, as shown in FIG. 5, the first terminal portion 62a and the second terminal portion 64a are pressed by the protrusions 34a and 38a, to be electrically connected to each other, and then the fuel cell 10 with the second sensor 42 being formed is completed.

Next, the third sensor 44 will be described.

As shown in FIG. 4, the third sensor 44 is a temperature sensor that detects the temperature of the frame member 24. The entire area of the third sensor 44 is formed in a sensor arrangement region 48B provided in the frame member 24. The third sensor 44 includes a sensor portion 50 similar to the first sensor 40 and a wiring portion 55 having a first wiring pattern 52 and a second wiring pattern 54.

Figure 6:
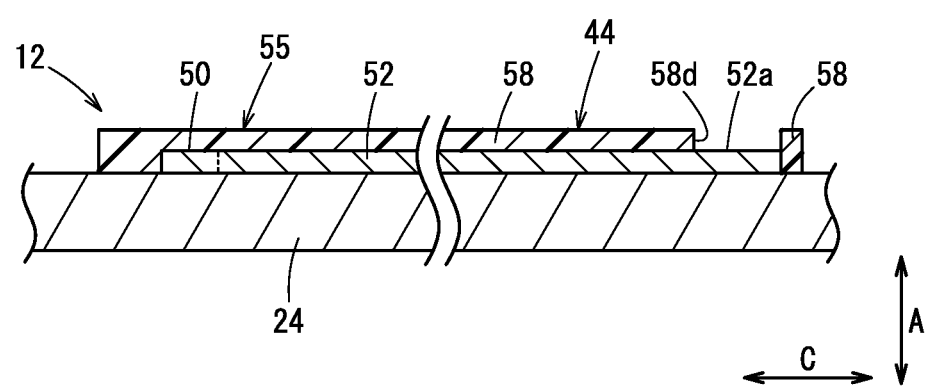
FIG. 6 is a cross-sectional view taken along line VI-VI of FIG. 4.

However, as shown in FIG. 6, when the frame member 24 is made of an insulating resin material, the base insulating film 56 may not be provided under the sensor portion 50, the first wiring pattern 52, and the second wiring pattern 54. In this case, the frame member 24 also serves as the base insulating film 56. The sensor portion 50, the first wiring pattern 52, the second wiring pattern 54, and the sensor arrangement region 48B therearound are covered with the covering insulating film 58 in order to prevent a short circuit with the second separator 16. An opening portion 58d of the covering insulating film 58 is formed in an outer peripheral portion of the third sensor 44. A first connection pad 52a and a second connection pad 54a (see FIG. 4) are formed by the first wiring pattern 52 and the second wiring pattern 54 being exposed from the opening portion 58d The third sensor 44 can be manufactured by preparing the frame member 24 and sequentially forming the sensor portion 50, the first wiring pattern 52 and the second wiring pattern 54, and the covering insulating film 58 on the surface of the frame member 24. These steps are the same as the manufacturing steps of the first sensor 40.

Next, the fourth sensor 46 will be described.

Figure 7:
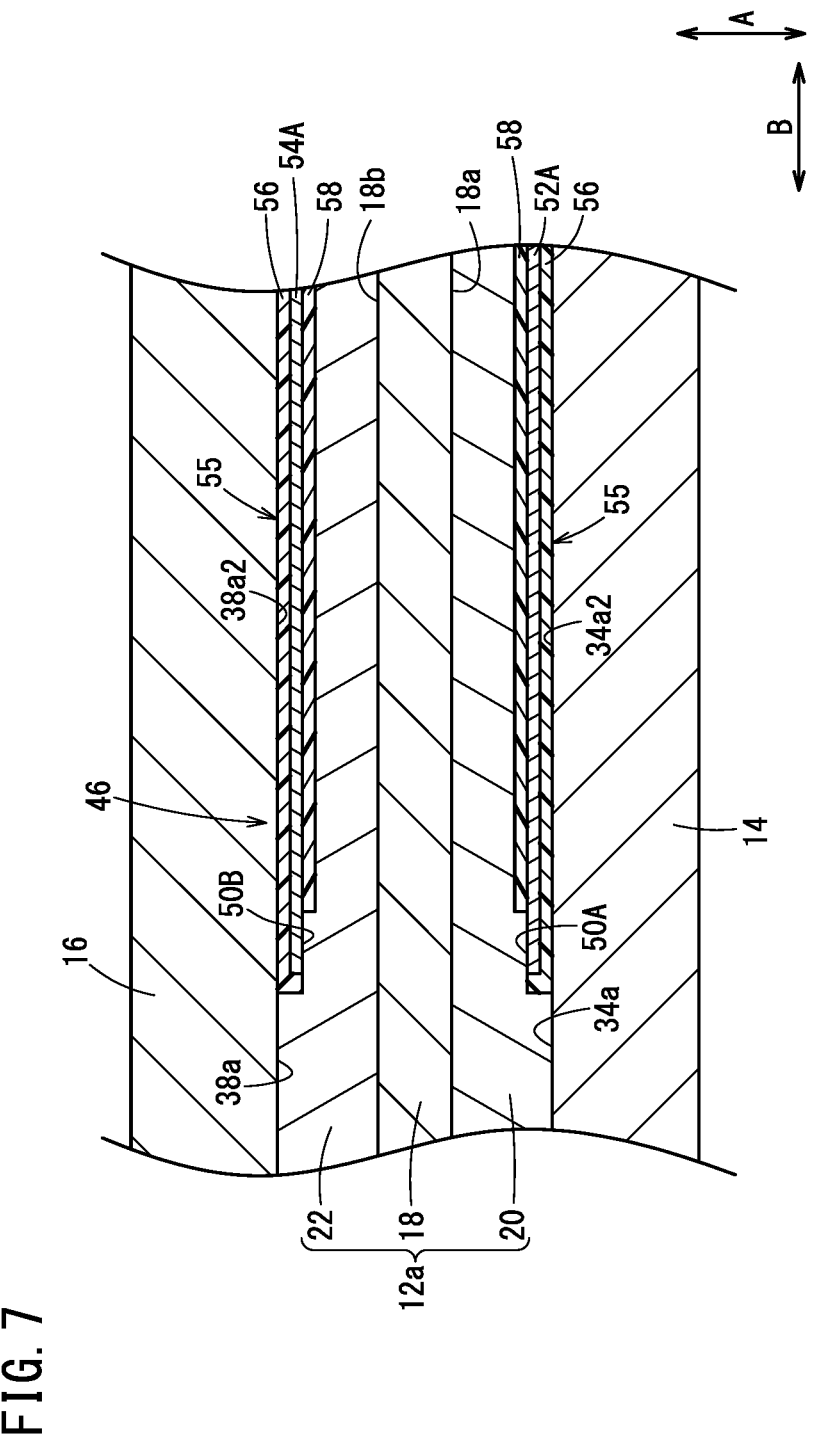
FIG. 7 is a cross-sectional view of the fuel cell taken along line VII-VII of FIG. 2.

As shown in FIG. 7, the fourth sensor 46 has a first wiring pattern 52A formed along the upper end portion 34a2 of the protrusion 34a of the first separator 14 and a second wiring pattern 54A formed along the upper end portion 38a2 of the protrusion 38a of the second separator 16. The first wiring pattern 52A and the second wiring pattern 54A are provided at portions facing each other and have the same shape in a plan view (see FIG. 2).

The first wiring pattern 52A is formed on the base insulating film 56 and is insulated from the first separator 14 via the base insulating film 56. The second wiring pattern 54A is also formed on the base insulating film 56. The second wiring pattern 54A is insulated from the second separator 16 via the base insulating film 56. The base insulating film 56 of the second separator 16 is formed over the entire area of a sensor arrangement region 48C formed so as to be elongated as shown in FIG. 2. The sensor arrangement region 48C and the base insulating film 56, of the first separator 14, are also formed in the same shape. The first wiring pattern 52A and the second wiring pattern 54A are covered with the covering insulating film 58 and insulated from the anode 20 or the cathode 22.

As shown in FIG. 7, a first sensor portion 50A in which the first wiring pattern 52A is exposed from the covering insulating film 58 is formed at the tip of the first wiring pattern 52A. In addition, a second sensor portion 50B in which the second wiring pattern 54A is exposed from the covering insulating film 58 is formed at the tip of the second wiring pattern 54A. The first sensor portion 50A and the second sensor portion 50B are provided at positions overlapping each other in a plan view, and arranged face-to-face with each other across the MEA 12a.

The first sensor portion 50A and the second sensor portion 50B are pressed toward the MEA 12a via the protrusions 34a and 38a, and the first sensor portion 50A is in contact with the anode 20 so as to sink into the anode 20. Further, the second sensor portion 50B is in contact with the cathode 22 so as to sink into the cathode. The fourth sensor 46 can detect local impedance of the MEA 12a by applying an AC (alternating-current) voltage between the first sensor portion 50A and the second sensor portion 50B.

The fuel cell 10 having the fourth sensor 46 is manufactured by a step of manufacturing the first separator 14 provided with the first wiring pattern 52A, a step of manufacturing the second separator 16 provided with the second wiring pattern 54A, and a step of laminating the first separator 14, the frame equipped MEA 12, and the second separator 16.

In the above manufacturing process, the first separator 14 provided with the first wiring pattern 52A is manufactured by a step of sequentially forming the base insulating film 56, the first wiring pattern 52A, and the covering insulating film 58 on the inner surface 14a thereof. In addition, the second separator 16 provided with the second wiring pattern 54A is manufactured by a step of sequentially forming the base insulating film 56, the second wiring pattern 54A, and the covering insulating film 58 on the inner surface 16a thereof. The step of manufacturing the first wiring pattern 52A and the second wiring pattern 54A can be performed in the same manner as the step of forming the first sensor 40 on the second separator 16. Through the above steps, the fuel cell 10 having the fourth sensor 46 is obtained.

The fuel cell 10 of the present embodiment has the following effects.

According to the present embodiment, a fuel cell 10 includes: a MEA 12a (membrane electrode assembly) including an electrolyte membrane 18, an anode 20 provided on a first surface 18a of the electrolyte membrane 18, and a cathode 22 provided on a second surface 18b of the electrolyte membrane 18; a frame member 24 surrounding an outer peripheral portion of the MEA 12a; a pair of separators 14, 16 sandwiching the MEA 12a; and a sensor 40, 42, 44, 46 including a sensor portion 50, 50A, 50B provided on at least one of the separators 14, 16, the frame member 24, or the electrolyte membrane 18, and a wiring portion 55 connected to the sensor portion 50, 50A, 50B and extending to an outer peripheral portion of the separator 14, 16 or the outer peripheral portion of the MEA 12a. The sensor 40, 42, 44, 46 includes: a base insulating film 56 covering a sensor arrangement region 48, 48A, 48B, 48C in which the sensor 40, 42, 44, 46 is arranged; a wiring pattern 52, 52A, 54, 54A laminated on the base insulating film 56; and a covering insulating film 58 covering the wiring pattern 52, 52A, 54, 54A and a portion of the base insulating film 56 that is not covered with the wiring pattern 52, 52A, 54, 54A.

With the above-described fuel cell 10, since the sensors 40, 42, 44, 46 can be formed in a thin film shape and integrally formed with the fuel cell 10, a complicated work of arranging the sensors 40, 42, 44, 46 becomes unnecessary, and a state quantity can be easily and accurately detected. Further, since the fuel cell 10 can prevent positional deviation of the sensors 40, 42, 44, 46, the fuel cell 10 is suitable for detecting a local state quantity of a desired portion.

In the fuel cells 10 described above, the separators 14 and 16 may include protrusions 34a, 38a. Each protrusion protrudes toward the MEA 12a and presses the MEA 12a, and the sensor portion 50, 50A, 50B may be provided at a position corresponding to the protrusion 34a, 38a of the separator 14, 16. With the fuel cell 10, since the sensor portion 50, 50A, 50B can be brought into close contact with the measurement target, measurement can be performed with higher accuracy.

In the fuel cell 10 described above, the sensor portion 50 may be formed on the base insulating film 56, and may be covered by the covering insulating film 58, together with the wiring patterns 52, 54. In the fuel cell 10, since the separators 14 and 16, the MEA 12a, and the like can be electrically insulated from the sensor portion 50, measurement can be performed with high accuracy.

In the above fuel cell 10, the sensor portion 50 may be provided on a surface of the electrolyte membrane 18, the wiring portion 55 may include: a first wiring portion 62 extending along a surface of the electrolyte membrane 18 and connected to the sensor portion 50; and a second wiring portion 64 extending along a surface of the separator 14, 16, and the first wiring portion 62 and the second wiring portion 64 may be electrically connected to each other by bringing a first terminal portion 62a where the wiring pattern 52, 54 of the first wiring portion 62 is exposed from the covering insulating film 58 and a second terminal portion 64a where the wiring pattern 52, 54 of the second wiring portion 64 is exposed from the covering insulating film 58 into face-to-face contact with each other. According to the fuel cell 10, since the wiring portion 55 of the sensor portion 50 can be provided on the electrolyte membrane 18 and the separators 14 and 16, the flexibility of the arrangement position of the sensor portion 50 is increased.

In the fuel cells 10 described above, the separator 14, 16 may include: a plurality of protrusions 34a, 38a protruding toward the MEA 12a and extending along a flow direction of a reactant gas; and flow grooves 34b, 38b formed between the protrusions 34a, 38a, and the wiring portion 55 may be provided along the flow groove 34b, 38b. According to the fuel cell 10, it is possible to prevent wear of the wiring portion 55 due to friction with the protrusions 34a, 38a.

In the fuel cell 10 described above, the covering insulating film 58 may be formed such that a portion covering the wiring patterns 52 and 54 and another portion covering portions other than the wiring patterns 52 and 54 have a uniform height.

In the fuel cell 10 described above, the wiring portion 55 may include a protrusion crossing portion 60 that crosses a protrusion 34a, 38a, the protrusion 34a, 38a protruding from the separator 14, 16 to press the MEA 12a, and the covering insulating film 58 of the protrusion crossing portion 60 may be formed thicker than the covering insulating film 58 of other portions. According to the fuel cell 10, it is possible to suppress damage due to wear of the covering insulating film 58 in the protrusion crossing portion 60.

In the fuel cells 10 described above, the protrusion 34a, 38a of the separator 14, 16 may have a flat surface at least at a portion corresponding to the protrusion crossing portion 60. According to the fuel cell 10, it is possible to distribute the load of the protrusion crossing portion 60 and to prevent the wiring patterns 52 and 54 from being damaged due to concentration of the load.

In the fuel cell 10 described above, the wiring patterns 52 and 54 may include a first wiring pattern 52 formed of a first metal and a second wiring pattern 54 formed of a second metal different from the first metal, and the sensor portion 50 may be a contact point of a thermocouple in which a tip of the first wiring pattern 52 and a tip of the second wiring pattern 54 are in contact with each other.

In the fuel cell 10 described above, the sensor 44 may be formed on the frame member 24, and the frame member 24 may also serve as the base insulating film 56. According to the fuel cell 10, the step of forming the base insulating film 56 individually is not necessary, the manufacturing process can be simplified.

In the above fuel cell 10, the wiring portion 55 may include: a first wiring portion 62 formed on a surface of one separator 14 of the separators and including a first wiring pattern 52A; and a second wiring portion 64 formed on a surface of the other separator 16 and including a second wiring pattern 54A, the sensor portion 50 includes: a first sensor portion 50A where the first wiring pattern 52A is exposed at an end portion of the first wiring portion; and a second sensor portion 50B where the second wiring pattern 54A is exposed at an end portion of the second wiring portion, and the first sensor portion 50A and the second sensor portion 50B may be disposed so as to sandwich the MEA 12a, and may be electrically connected to the MEA 12a. According to the fuel cell 10, by applying an alternating-current (AC) voltage between the first sensor portion 50A and the second sensor portion 50B, a local impedance of the MEA 12a can be detected.

Although the present invention has been described with reference to a preferred embodiment, it is needless to say that the present invention is not limited to the above-described embodiment and various modifications can be made without departing from the essence and gist of the present invention.

What is claimed is:

1. A fuel cell comprising:
   a membrane electrode assembly including an electrolyte membrane, an anode provided on one surface of the electrolyte membrane, and a cathode provided on another surface of the electrolyte membrane;
   a frame member surrounding an outer peripheral portion of the membrane electrode assembly;
   a pair of separators sandwiching the membrane electrode assembly; and
   a sensor including: a sensor portion provided on at least one of the separators, the frame member, or the electrolyte membrane; and a wiring portion connected to the sensor portion and extending to an outer peripheral portion of one of the separators or the outer peripheral portion of the membrane electrode assembly,
   wherein the sensor further includes:
   a base insulating film that covers a surface of a sensor arrangement region in which the sensor is arranged;
   a wiring pattern laminated on the base insulating film; and
   a covering insulating film that covers the wiring pattern and a portion of the base insulating film that is not covered with the wiring pattern,
   wherein the sensor portion is provided on a surface of the electrolyte membrane,
   wherein the wiring portion includes:
   a first wiring portion extending along a surface of the electrolyte membrane and connected to the sensor portion; and
   a second wiring portion extending along a surface of the separator, and
   wherein the first wiring portion and the second wiring portion are electrically connected to each other by bringing a first terminal portion where the wiring pattern of the first wiring portion is exposed from the covering insulating film and a second terminal portion where the wiring pattern of the second wiring portion is exposed from the covering insulating film into face-to-face contact with each other.

\* \* \* \* \*